United States Patent [19]

Kretschmer

[11] Patent Number: 4,688,840
[45] Date of Patent: Aug. 25, 1987

[54] AERODYNAMIC ARRANGEMENT FOR A PASSENGER MOTOR VEHICLE

[75] Inventor: Helmut Kretschmer, Waldaschaff, Fed. Rep. of Germany

[73] Assignee: Dr. Ing. h.c.F. Porsche Aktiengesellschaft, Fed. Rep. of Germany

[21] Appl. No.: 855,357

[22] Filed: Apr. 24, 1986

[30] Foreign Application Priority Data

Apr. 24, 1985 [DE] Fed. Rep. of Germany ....... 3514790

[51] Int. Cl.$^4$ .............................................. B62D 35/00
[52] U.S. Cl. .................................................. 296/1 S
[58] Field of Search ....................... 296/1 S; D12/181

[56] References Cited

U.S. PATENT DOCUMENTS 4,533,168 8/1985 Janssen et al. ...................... 296/1 S
4,558,898 12/1985 Deaver ................................ 296/1 S Primary Examiner—Robert R. Song
Attorney, Agent, or Firm—Barnes & Thornburg

[57] ABSTRACT

An aerodynamic arrangement is arranged in the rear area of the rear end of a passenger motor vehicle which is composed of a guide element provided at the top side of the rear end and of a wing disposed thereabove, whereby the resulting nozzle-shaped gap has an inlet opening which is located in a vertically extending plane. A rear separating edge of the guide element is arranged at approximately one-third to one-half the length of the wing. An aerodynamic arrangement is created at the rear end of a passenger motor vehicle by this construction which with low structural height assures a good visibility toward the rear and by means of which, in addition to a reduction of the air drag coefficient, an effective negative lift at the rear axle is achieved at the same time.

36 Claims, 6 Drawing Figures

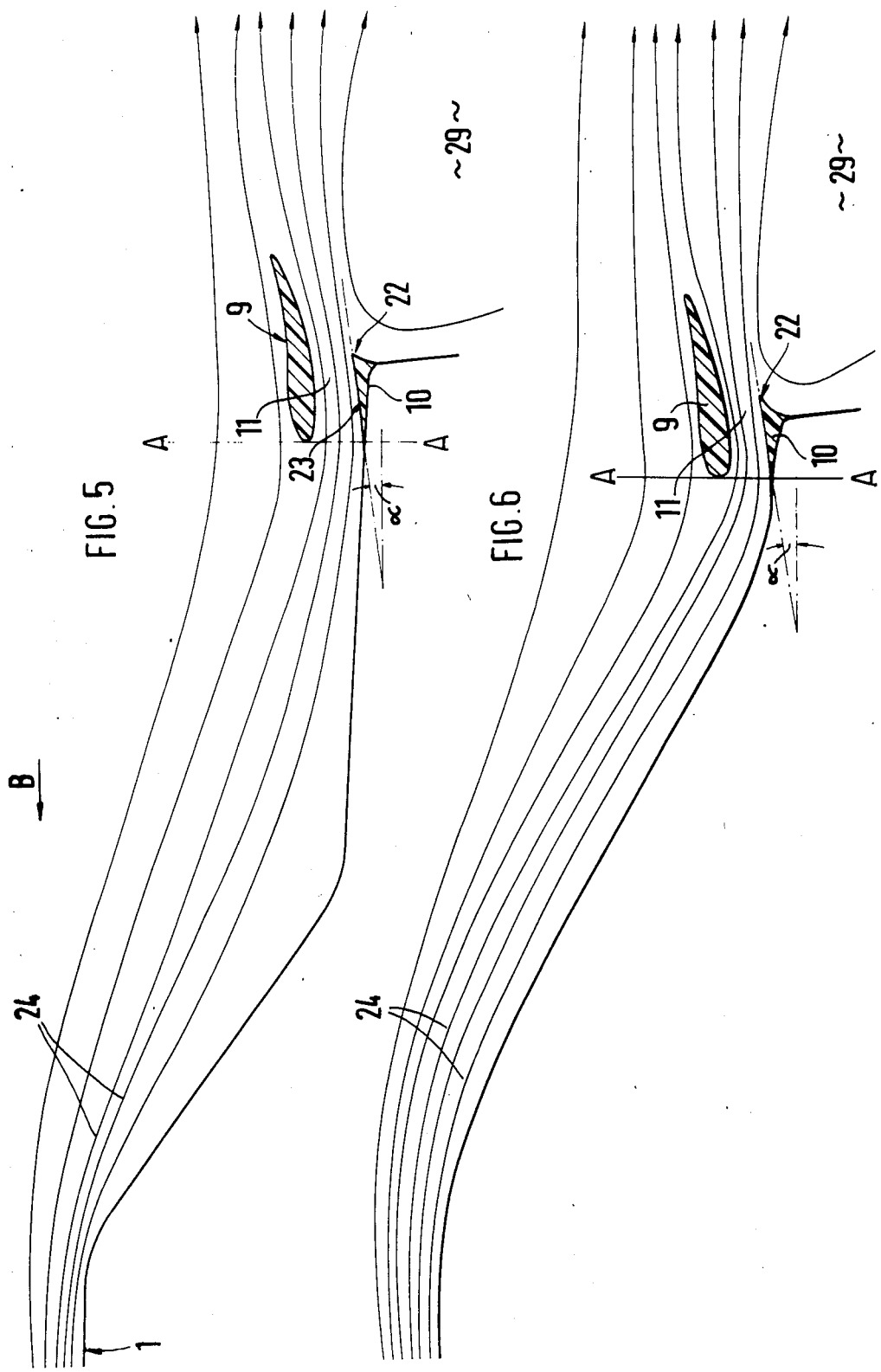

AERODYNAMIC ARRANGEMENT FOR A PASSENGER MOTOR VEHICLE

The present invention relates to an aerodynamic arrangement for a passenger motor vehicle, which is arranged in the rear area of a fast-back, of a notch-back or of a fast-notch-back and consists of a guide element and of a wing having the shape of an air foil, whereby the wing and the guide element extend at a vertical distance to one another and a nozzle-shaped gap is provided at the aerodynamic arrangement.

A known aerodynamic arrangement (DE-OS No. 31 32 369) at a passenger motor vehicle provided with a fast-back consists of a guide element (spoiler) secured at the rear opening lid or hatch-back lid and of a wing extending over the rear end, whereby the wing is arranged offset forwardly and upwardly with respect to the guide element.

The wing serves in this arrangement for the purpose of avoiding a flow separation and therewith a dead water area ahead of the guide element. This takes place essentially by a contraction of the flow between the round forward edge of the wing and the top side of the vehicle rear end. For achieving significant negative lift (traction) forces or power take-off forces, this wing appears suitable only limitedly by reason of its slight length dimension (approximately half the spoiler length).

A reduced drag coefficient and in increase of the negative lift forces at the rear axle is achieved with this prior art arrangement only by the guide element. Additionally, it entails the disadvantage that the unimpeded visibility out of the vehicle toward the rear is impaired by the relatively high and forwardly displaced wing. Furthermore, the wing and the guide element form a component of large area which requires complex and cost-intensive tools for the manufacture thereof.

Additionally, for achieving a desired negative lift force, the guide element must be arranged relatively high at the vehicle rear end which, however, leads to the fact that an increased dead water area results in the rear end, with the consequence that the drag coefficient is increased.

Therebeyond, it must be noted that with a spoiler only the top side is utilizable for producing the negative lift.

It is the object of the present invention to so construct an aerodynamic arrangement provided in the rear area of a passenger motor vehicle that, on the one hand, a good visibility toward the rear is assured with low structural height and that, on the other, in addition to a reduction of the overall air drag, an effective negative lift at the rear axle is achieved at the same time.

The underlying problems are solved according to the present invention in that a nozzle-shaped gap is formed by a wing and guide element disposed therebelow and has an inlet opening located on a vertically extending plane, and in that a rear separating edge of the guide element is arranged at approximately one-third to one-half of the length of the wing.

The advantages principally achieved with the present invention reside in that as a result of the arrangement and construction of the wing and of the guide element in accordance with the present invention, an aerodynamic arrangement is created which with good visibility toward the rear has a compact construction (low structural height) and by means of which the ratio of lift to drag coefficient (CA/CW) is considerably improved.

A negative lift force is achieved both at the wing top side as also at the wing bottom side by the wing inclined with respect to the top side of the vehicle rear end and by the short guide element disposed therebelow. Owing to the relatively small distance of the wing from the top side of the vehicle rear end, a part of the flow deceleration is also effective on the top side of the vehicle rear end which leads to an additional increase of the rear axle traction or driving output and to an air drag coefficient reduction.

Furthermore, owing to the deflection of the flow by means of the guide element with simultaneous acceleration of the flow in the nozzle-shaped gap between the guide element and the wing bottom side, the flow is caused to abut at the convexly curved wing bottom side, even with large angles of incidence of the wing. The negative lift force at the wing is increased thereby. Additionally, the characteristic height of the dead water area in the rear end is reduced by the flow accelerated in the nozzle-shaped gap. This takes place by the fact that the energy-rich nozzle flow tears along in the rearward direction parts of the low-energy flow of the dead water area by reason of shear forces and thus reduces the dead water area (entrainment effect), which in turn has as a consequence a drag coefficient reduction.

These and other objects, features and advantages of the present invention will become more apparent from the following description when taken in connection with the accompanying drawing which shows, for purposes of illustration only, two embodiments of an arrangement in accordance with the present invention, and wherein:

FIG. 5 is a view, corresponding to FIG. 2, of an aerodynamic arrangement for a notch-back-type vehicle; and FIG. 6 is a view, similar to FIG. 5, of an aerodynamic arrangement in accordance with the present invention for a fast-back-type motor vehicle.

Figure 1:
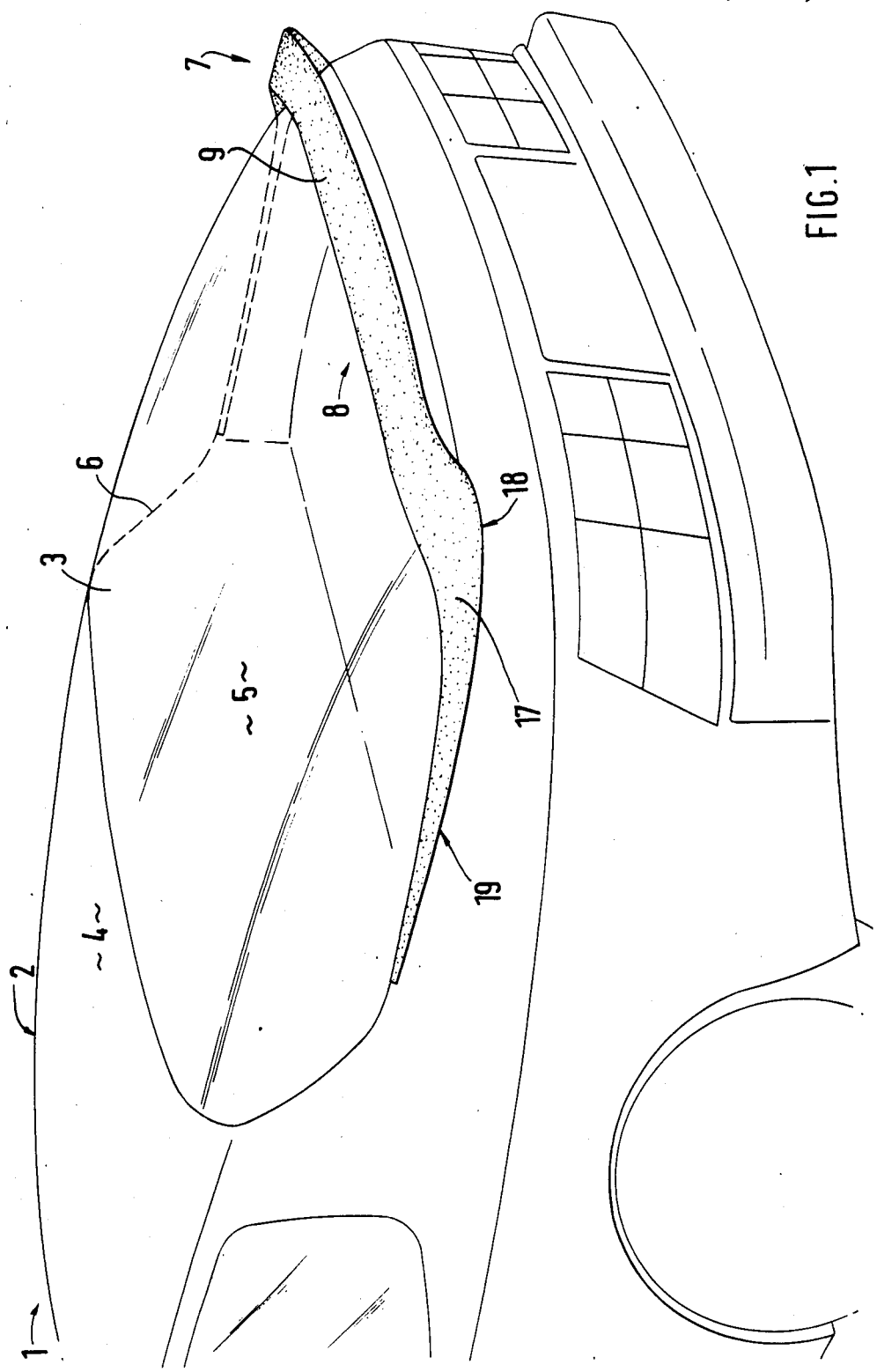
FIG. 1 is a perspective view from the rear left on a passenger motor vehicle with an aerodynamic arrangement in accordance with the present invention, arranged at the rear end of the vehicle.
Figure 2:
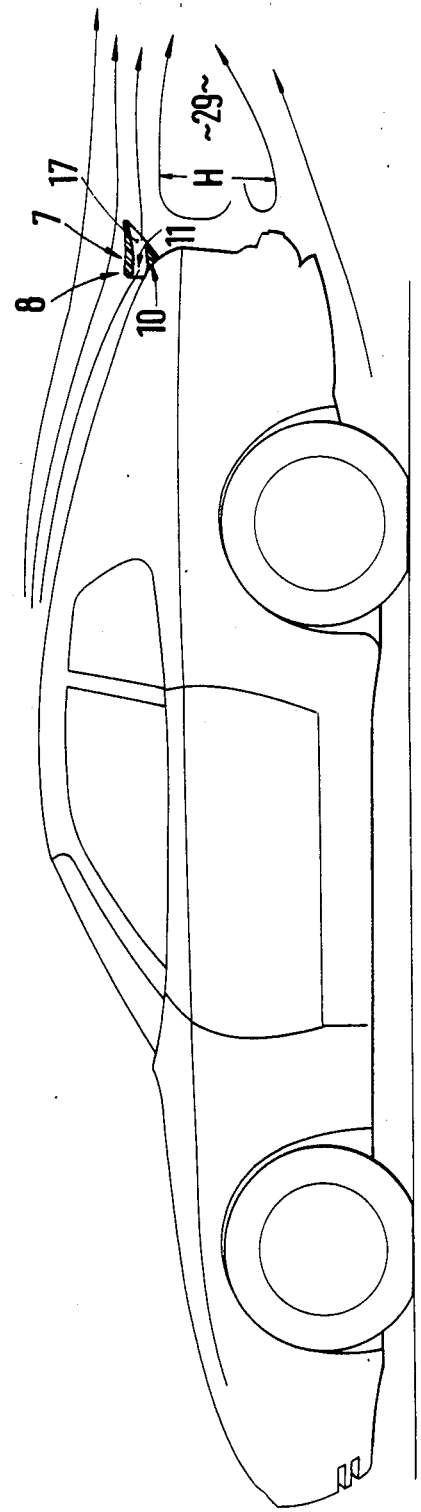
FIG. 2 is a side elevational view of the passenger motor vehicle with the aerodynamic arrangement in accordance with the present invention, partly in cross section.

Referring now to the drawing wherein like reference numerals are used throughout the various views to designate like parts, a passenger motor vehicle generally designated by reference numeral 1 (FIG. 1) includes in the illustrated area a body generally designated by reference numeral 2 with a pivotal lid 3 which is pivotally supported at its upper side by way of hinges (not shown) at an adjoining roof 4. The lid 3 is formed by a rear window 5 and a frame 6 which circumferentially surrounds the rear window 5.

The rear window 5 has such an angle of inclination, as viewed in longitudinal cross section, that a separation-free flow off the roof edge and a separation-free flow over the rear window is assured. According to FIGS. 1 to 4, an aerodynamic arrangement generally designated by reference numeral 8 is provided in a rear area 7 of the fast-back-type passenger motor vehicle 1, by means of which the air drag of the vehicle is reduced and at the same time the dynamic wheel pressure (negative lift) at the rear axle is improved during the drive.

Figures 3, 4:
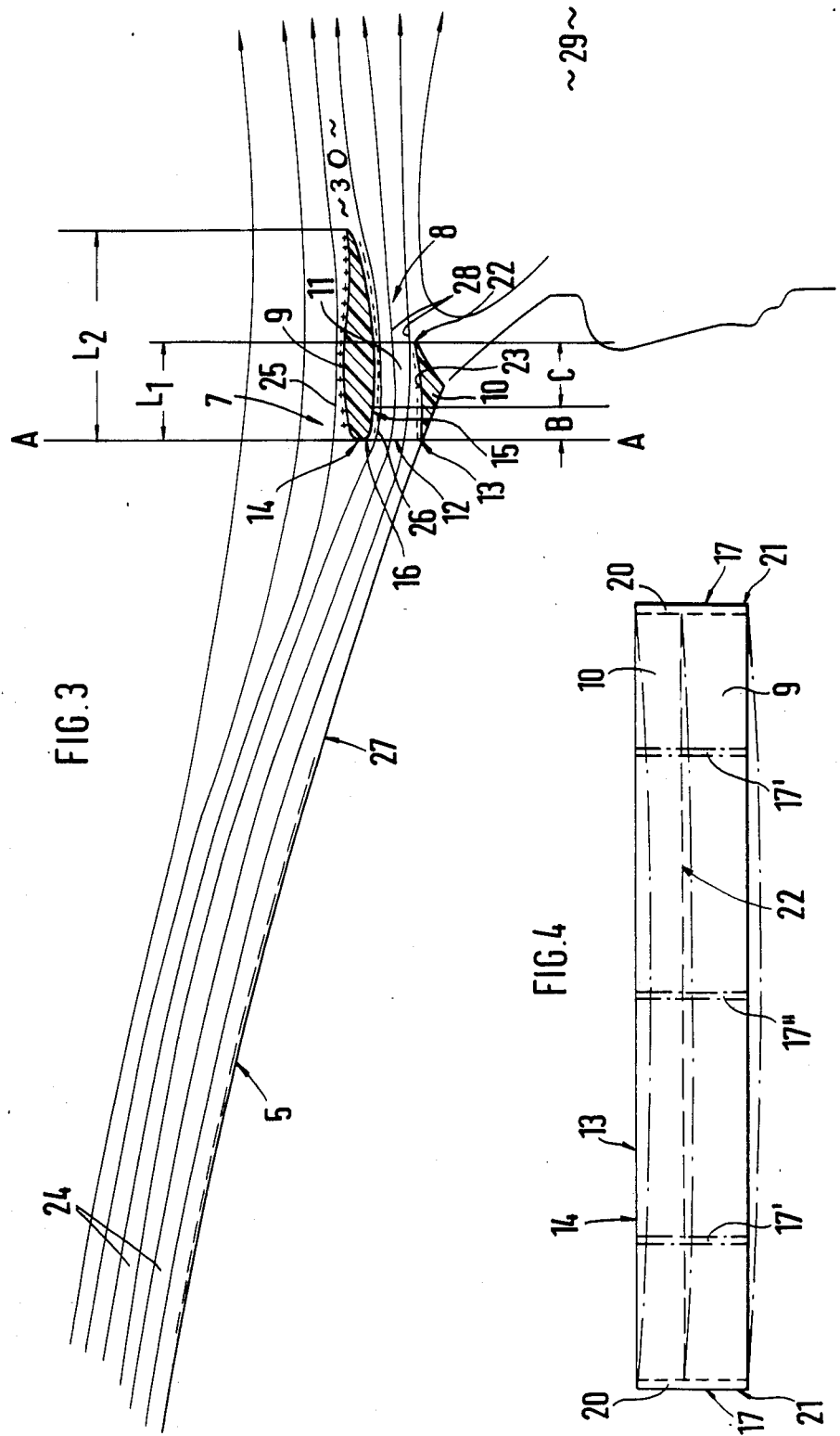
FIG. 3 is a detail, on an enlarged scale of FIG. 2.
FIG. 4 is a modified plan view on the aerodynamic arrangement in accordance with the present invention.

The aerodynamic arrangement 8 is composed of a wing 9 and of a guide element 10 arranged therebelow which together form a nozzle-shaped gap 11. An inlet opening 12 of the gap 11 is located thereby in a vertically extending plane A—A, i.e., the forward edges 13 and 14 of the wing 9 and of the guide element 10 are constructed approximately congruent as viewed in plan view (FIG. 4). The forward edges 13 and 14 may, according to FIG. 4, extend either rectilinearly or may have a bent configuration (illustrated in dash-and-dotted lines).

The wing 9 extending over the rear window has in cross section the shape of an air foil profile whose bottom side 15 is curved convexly and whose forward end is provided with a nose-like rounded-off configuration 16. The wing 9 is arranged in a non-detached flow area of the vehicle rear end—the flow remains attached—and extends over a considerable part of the width of the passenger motor vehicle. According to FIG. 1, the wing 9 is connected with the guide element 10 into a structural unit generally designated by reference number 18 by way of lateral, outwardly disposed webs 17 whereby the webs 17 are drawn downwardly and forwardly along lateral legs 19 of the frame 6 with continuous cross-sectional reduction. The structural unit 18 is secured in a suitable manner at the rear end, respectively, at the lid 3.

However, the possibility also exists that the webs 17 are formed by vertically extending wall sections 20 (FIG. 4) which connect the upwardly disposed wing 9 with the guide element 10 disposed therebelow. As shown in FIG. 4, in lieu of the webs 17, also webs 17' extending offset to the outsides 21 may be provided (illustrated in dash-and-dotted line) or a web 17" may be arranged in a center area of the aerodynamic arrangement 8.

The guide element 10 has a considerably smaller length $L_1$ than the length $L_2$ of the wing 9 (FIG. 3) in such a manner that a rear separating edge 22 of the guide element which is constructed with a sharp edge, is arranged approximately at one-third to one-half the length $L_2$ of the wing 9. According to FIG. 2, the guide element 10 has in cross section approximately the shape of a triangle whereby a top side 23 of the guide element 10 extends at least within an area C (FIG. 3) approximately parallel to the bottom side 15 of the wing 9 disposed thereabove.

The nozzle-shaped gap 11 between wing 9 and guide element 10 extends over the entire width of the structural unit 18 and has an essentially constant cross section. As viewed in longitudinal cross section (FIG. 3) the nozzle shaped gap 11 has its largest cross section within the area of the vertically extending plane A—A, which cross section is reduced continuously within an adjoining area B whereas the cross section in the following area C is approximately constant. Both the guide element 10 as also the wing 9 project sectionwise beyond the rear end of the rear lid 3.

However, the possibility also exists that the guide element 10 is formed by a separate component which is mounted on the top side of the vehicle rear end and is secured thereon in a conventional manner.

In a passenger motor vehicle with a notch-back (FIG. 5), respectively, with a fast-back (FIG. 6), it is also possible that the guide element 10 is formed by a wall section of the rear end of the vehicle extending approximately parallel to the wing bottom side, i.e., the guide element 10 is integrated into the body (not illustrated).

Depending on the shape of the vehicle rear end, the interior height of the gap within an area C amounts to about 35 to about 100 mm. whereby a gap height of about 40 mm. with a wing length of 180 mm. has proved particularly favorable for the passenger motor vehicle illustrated in FIG. 1. With a gap height $\leq 35$ mm., the aimed-at function of the aerodynamic arrangement no longer exists. The ratio of gap height to wing length amounts to about 1:2 about 1:5, depending on the rear window inclination of the passenger motor vehicle.

The angle of incidence of the wing 9 and of the guide element 10 with respect to the rear window overflow is different from vehicle to vehicle and can be determined empirically by measurements in a wind tunnel. According to FIG. 3, the top side 23 of the guide element 10 is arranged approximately horizontally. According to FIGS. 5 and 6, the top side 23 of the guide element 10 extends at an acute angle $\alpha$ to a horizontal in such a manner that it rises opposite the driving direction B.

During the drive of the passenger motor vehicle, the air flow 24 which passes the rear window 5 without detachment or separation, is divided by the inclined wing 9 into a wing overflow 25 and a wing underflow 26. As a result of the angle of incidence of the wing 9 with respect to the rear end overflow 24, the flow velocity is reduced on the wing top side and is accelerated on the wing bottom side 15, whereby a negative lift force is produced and, more particularly, on both sides of the wing 9. An excess pressure area results on the top side of the wing 9, due to the flow deceleration, which is effective in the manner of producing a negative lift force. A vacuum occurs at the bottom side 15 of the wing 9 increased in comparison to the adjoining rear end top side 27, ahead of the wing, which also is effective in producting a negative lift force. A detachment-free or separation-free flow over the entire wing bottom side 15 is assured by the guide element 10. Furthermore, a reduction of the characteristic height H (FIG. 2) of the dead water area 29 at the vehicle rear end is acheived by the air stream 28 accelerated in the nozzle-shaped gap. This takes place in that the energy-rich air stream 28 tears along parts of energy-low flow of the dead water area 29 by reason of shear forces and thus reduces the dead water area 29 (entrainment effect) which is equivalent to an air drag reduction.

By the arrangement and construction of the guide element 10, a deflection of the air stream 26 is achieved. Within the area of the inlet opening 12 of the nozzle-shaped gap 11, a positive pressure area (relative excess pressure) results from the deflection at the top side of the guide element 10 which effects at and shortly in front of the guide element 10 a negative lift force and a drag coefficient reduction. The deflection of the air flow 24 by the wing 9 and the guide element 10 has as a consequence that a relative excess pressure is induced within the area located in front thereof (pre-ramming effect).

The reduction of the rear end dead water height H becomes the more effective the more energy rich the bottom flow is, which is the case in particular with a smooth lower surface. The same effect then occurs between the air layer 30 of the bottom surface which flows off upwardly and the rear end dead water 29 as in the upper area of the aerodynamic arrangement.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An aerodynamic arrangement for a passenger motor vehicle which is arranged in the rear area of the vehicle, comprising guide means, wing means having the form of an air foil, the wing means and guide means extending at a vertical distance with respect to one another, a nozzle-shaped gap being provided in the aerodynamic arrangement, the nozzle-shaped gap being formed by the wing means and the guide means disposed therebelow and having an inlet opening located on a substantially vertically extending plane, and a rear separating edge of the guide means being arranged at approximately one-third to approximately one-half the length of the wing means.

2. An aerodynamic arrangement according to claim 1, wherein the passenger motor vehicle has a fast-back construction in the rear area thereof.

3. An aerodynamic arrangement for a passenger motor vehicle according to claim 1, wherein the vehicle has a notch-back construction in the rear area thereof.

4. An aerodynamic arrangement according to claim 1, wherein the rear end of the vehicle is of the fast-back-notch-back type.

5. An aerodynamic arrangement according to claim 1, wherein the forward edges of the wing means and of the guide means are constructed substantially congruent as viewed in plan view.

6. An aerodynamic arrangement according to claim 1, wherein the wing means is connected with the guide means into a structural unit by way of lateral, outwardly disposed webs.

7. An aerodynamic arrangement according to claim 1, wherein the guide means is formed by a separate component which is mounted on the top side of the rear end of the vehicle and is secured thereon.

8. An aerodynamic arrangement according to claim 1, wherein the guide means is formed by a wall section of the vehicle rear and extending approximately parallelly to a bottom side of the wing means.

9. An aerodynamic arrangement according to claim 1, wherein within the area of the vertically extending plane, the nozzle-shaped gap has its largest cross section which adjacent thereto is continuously reduced within an area of a forward rounded-off, nose-like portion of the wing means whereas in a following area the cross section is approximately constant.

10. An aerodynamic arrangement according to claim 9, wherein a top side of the guide means extends approximately parallel at least within an area to the section of the wing bottom side disposed thereabove.

11. An aerodynamic arrangement according to claim 1, in which a fast-back of the passenger motor vehicle includes a pivotal lid provided with a rear window, the wing means and guide means being arranged at the lid, and the top side of the guide means and of the wing means being inclined with respect to the inclination of the rear window.

12. An aerodynamic arrangement according to claim 11, wherein both the guide means as also the wing means project sectionwise beyond the lid means.

13. An aerodynamic arrangement according to claim 1, wherein the gap between the wing means and the guide means is essentially constant over the entire transverse dimension of the aerodynamic arrangement.

14. An aerodynamic arrangement according to claim 13, wherein the height of the gap amounts to about 35 mm. to about 100 mm. as measured within an area thereof.

15. An aerodynamic arrangement according to claim 14, wherein the ratio of gap height to wing length amounts to about 1:2 to about 1:5 depending on rear window inclination.

16. An aerodynamic arrangement according to claim 1, wherein the height of the gap amounts to about 35 mm. to about 100 mm. as measured within an area thereof.

17. An aerodynamic arrangement according to claim 1, wherein the ratio of gap height to wing length amounts to about 1:2 to about 1:5 depending on rear window inclination.

18. An aerodynamic arrangement according to claim 9, in which a fast-back of the passenger motor vehicle includes a pivotal lid provided with a rear window, the wing means and guide means being arranged at the lid, and the top side of the guide means and of the wing means being inclined with respect to the inclination of the rear window.

19. An aerodynamic arrangement according to claim 18, wherein both the guide means as also the wing means project sectionwise beyond the lid means.

20. An aerodynamic arrangement according to claim 1, wherein the configuration of the nozzle gap is such as to cause a pressure drop at a lower surface portion of the wing means which extends beyond the guide means so as to provide a negative lift on said lower surface portion.

21. An aerodynamic arrangement according to claim 1, wherein the configuration of the nozzle gap is such that air passing through the gap has its velocity increased to produce a shearing action with air located behind the guide means to reduce a drag coefficient normally encountered at the rear of a vehicle.

22. An aerodynamic arrangement according to claim 20, wherein the configuration of the nozzle gap is such that air passing through the gap has its velocity incresed to produce a shearing action with air located behind the guide means to reduce a drag coefficient normally encountered at the rear of a vehicle.

23. An aerodynamic arrangement according to claim 1, wherein a top surface of the guide means is angled with respect to horizontal by having a forward edge of the guide means at the inlet opening lower than the rearward edge.

24. An aerodynamic arrangement according to claim 9, wherein a top surface of the guide means is angled with respect to horizontal by having a forward edge of the guide means at the inlet opening lower than the rearward edge.

25. An aerodynamic arrangement according to claim 10, wherein a top surface of the guide means is angled with respect to horizontal by having a forward edge of the guide means at the inlet opening lower than the rearward edge.

26. An aerodynamic arrangement according to claim 13, wherein a top surface of the guide means is angled with respect to horizontal by having a forward edge of the guide means at the inlet opening lower than the rearward edge.

27. An aerodynamic arrangement according to claim 20, wherein a top surface of the guide means is angled with respect to horizontal by having a forward edge of the guide means at the inlet opening lower than the rearward edge.

28. An aerodynamic arrangement according to claim 21, wherein a top surface of the guide means is angled with respect to horizontal by having a forward edge of the guide means at the inlet opening lower than the rearward edge.

29. An aerodynamic arrangement according to claim 22, wherein a top surface of the guide means is angled with respect to horizontal by having a forward edge of the guide means at the inlet opening lower than the rearward edge.

30. An aerodynamic arrangement according to claim 1, wherein a rear edge of the guide element is configured with a sharp edge.

31. An aerodynamic arrangement according to claim 20, wherein a rear edge of the guide element is configured with a sharp edge.

32. An aerodynamic arrangement according to claim 23, wherein a rear edge of the guide element is configured with a sharp edge.

33. An aerodynamic arrangement according to claim 1, wherein the guide element is an air spoiler attached to the rear area of the vehicle.

34. An aerodynamic arrangement according to claim 20, wherein the guide element is an air spoiler attached to the rear area of the vehicle.

35. An aerodynamic arrangement according to claim 23, wherein the guide element is an air spoiler attached to the rear area of the vehicle.

36. An aerodynamic arrangement according to claim 24, wherein the guide element is an air spoiler attached to the rear area of the vehicle.

* * * * *